March 21, 1950     A. J. MARSHAUS     2,501,530
FISHING ROD AND REEL
Filed Aug. 14, 1946     2 Sheets-Sheet 1
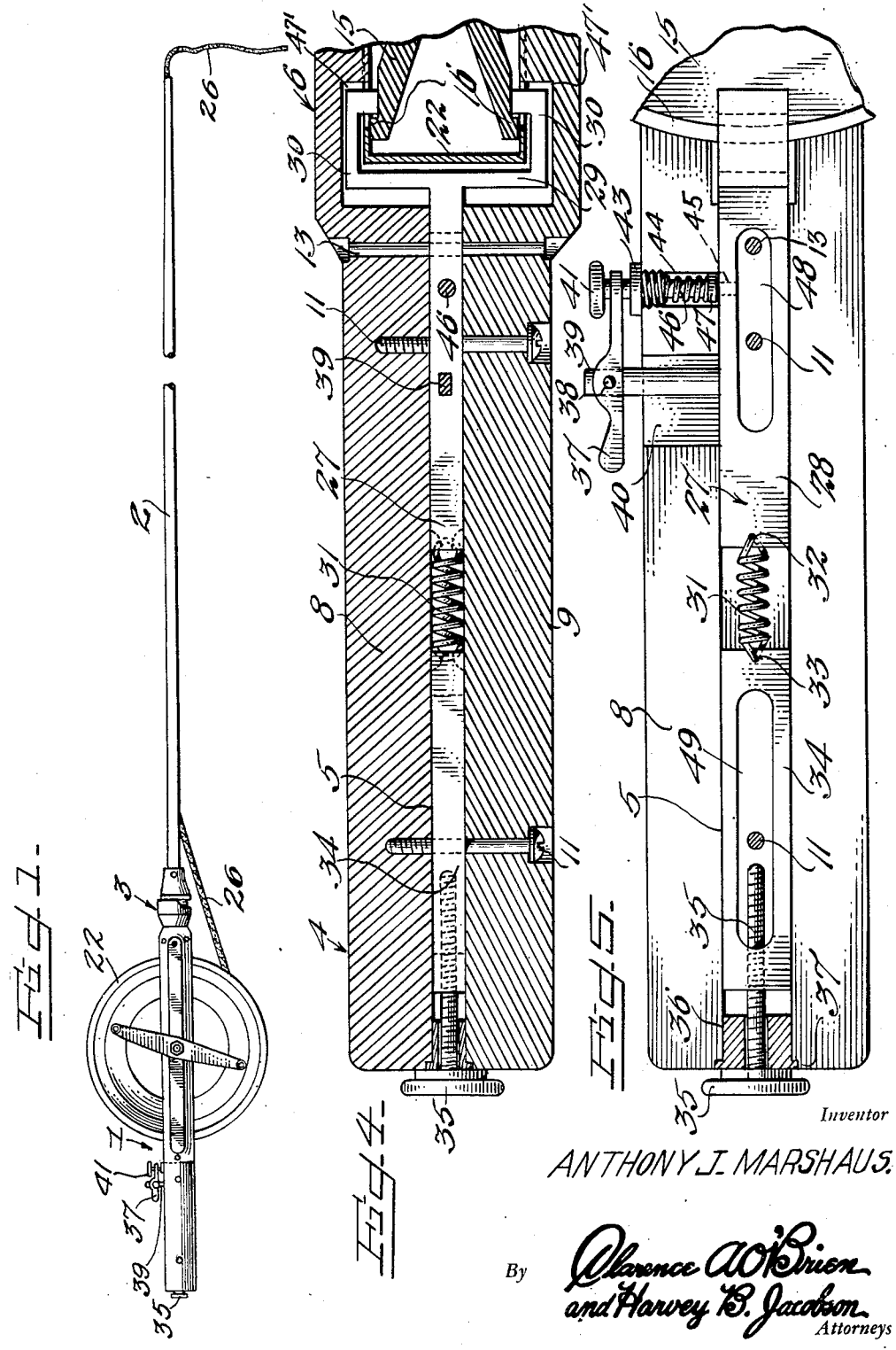
Inventor
ANTHONY J. MARSHAUS.
By Clarence A. O'Brien
and Harvey B. Jacobson
Attorneys

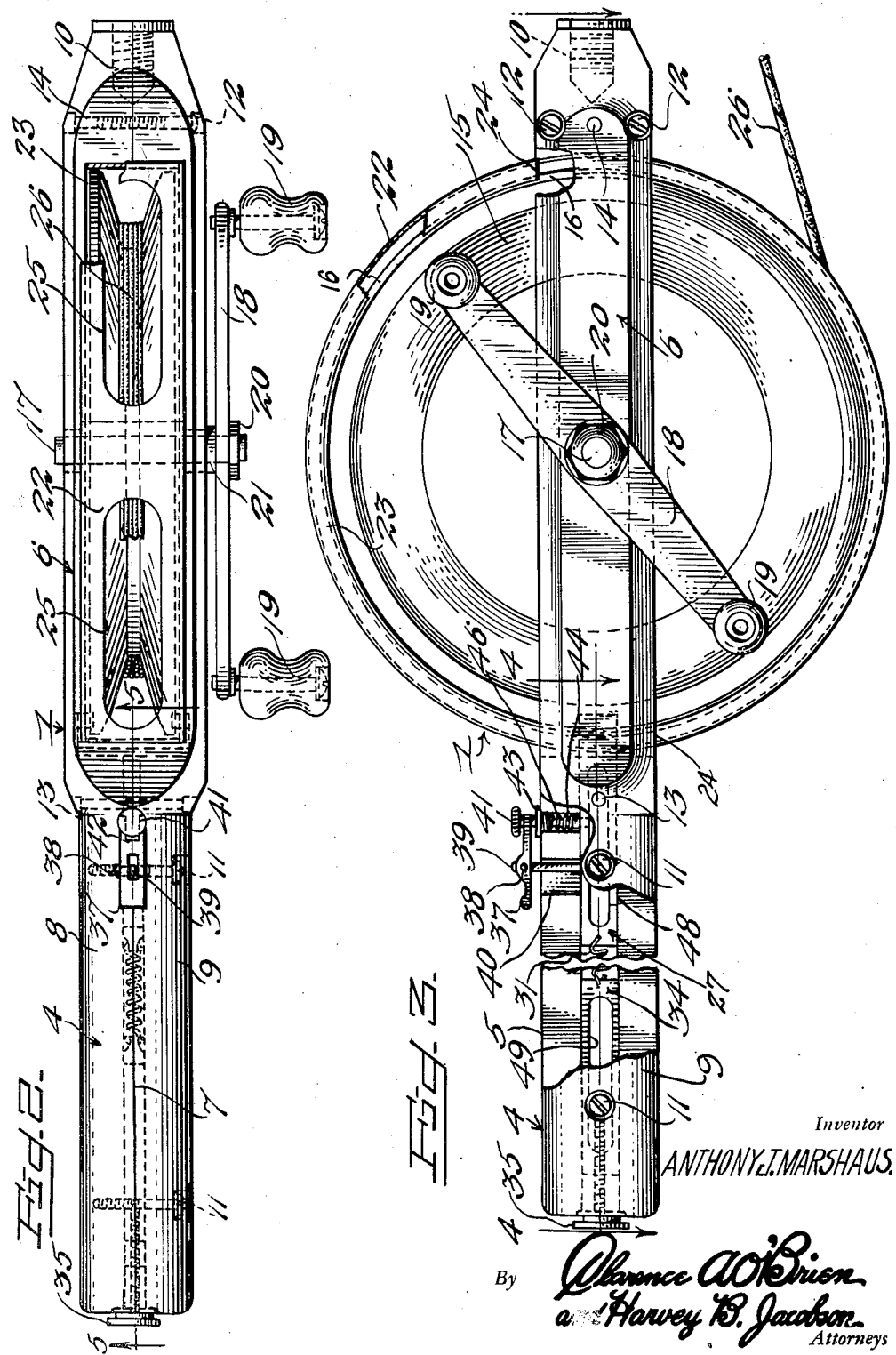

Patented Mar. 21, 1950

2,501,530

UNITED STATES PATENT OFFICE 2,501,530

FISHING ROD AND REEL

Anthony J. Marshaus, North East, Pa., assignor of one-half to Edward Smatt, Lyndhurst, Ohio Application August 14, 1946, Serial No. 690,423

3 Claims. (Cl. 43—20)

My invention relates to improvements in fishing rods and reels therefor.

An important object of my invention is to equip such rods with a simply constructed handle, reel and brake assembly easily taken apart and put together.

Still another object is to provide improved means for protecting the line on the reel and preventing the same from tangling on the reel.

Still another object is to achieve the above without materially increasing the cost of manufacture of the rod and said assembly.

Other and subordinate objects, also comprehended by my invention, together with the precise nature of my improvements will be readily understood when the succeeding description and claims are read with reference to the drawings accompanying and forming part of this specification.

In said drawings:

Figure 1 is a view in side elevation of my invention, in a preferred embodiment thereof, with the rod section broken away.

Figure 2 is a view in plan of the handle, reel and brake assembly drawn to a larger scale.

Figure 3 is a view of the same in side elevation with parts shown in section.

Figure 4 is a view in longitudinal section taken on the line 4—4 of Figure 3 and drawn to a still larger scale.

Figure 5 is a similar view taken on the line 5—5 of Figure 2.

Reference being had to the drawings by numerals, my invention, as shown therein, comprises as the basic component parts thereof, a handle, reel and brake assembly designated as a unit by the numeral 1, a rod section 2 and a joint 3 between said assembly and rod section.

The handle, reel and brake assembly 1 comprises a cylindrical handle 4 axially bored, as at 5, with an elongated straight straddle yoke 6 on the front end of the same in longitudinal alignment therewith. The handle 4 and straddle yoke 6 are longitudinally split, as at 7, in the median plane thereof to form a pair of side by side mating sections 8, 9. The front end of the straddle yoke 6 is constructed and arranged to form an internally threaded longitudinally extending socket 10 in said front end. A pair of screws 11 extending transversely through the handle 4 adjacent to the front and rear ends thereof, and similar screws 12 similarly extending through the straddle yoke 6 adjacent the front end of the same, detachably secure said sections 8, 9 together. Pins 13, 14, extending transversely through the front end of the handle 4 and the front end of the straddle yoke 6, and suitably fixed in either section 8, 9, provide for aligning the sections 8, 9, in assembling, prior to insertion of the screws 11, 12.

The reel 15 is of the circumferentially V-grooved type and is provided with circumferential lateral edge flanges 16 upon opposite sides thereof adapted to run with a working fit between the inner sides of the yoke 6 in which said reel 15 is rotatably mounted by means of a stud 17 extending transversely through said yoke 6 and suitably journaled in the sides thereof with the reel 15 suitably fixed thereon. A crank 18 with hand grip knobs 19 on opposite ends thereof is secured to one end of the stud 17 by means of a nut 20 on said end clamping said crank 18 against a collar 21 fast on said stud.

An annular guard 22 with narrow circumferential, internal edge flanges 23 surrounds the reel 15 concentrically and is fitted in the straddle yoke 6. The flanges 23 of said guard 22 are notched as indicated at 24 to accommodate therein the sides of the straddle yoke 6 whereby said guard 22 is anchored to the straddle yoke 6 against displacement therein. As will be understood, the guard 22 fits between the ends of the straddle yoke 6 whereby, together with the notches 24, said guard is held in concentric relation to the reel 15. Longitudinally extending slots 25 are provided in the periphery of the guard 22 for the passage of air therethrough to facilitate drying of a line 26 wound on the reel.

Coming now to the brake, a brake plunger 27 is provided in the handle 4 and which comprises a transversely square shank 28 endwise slidable in the front end portion of the bore 5 which is also square transversely as will be understood. The shank 28 of the plunger 27 is provided in the rear end of the yoke 6 with a cross yoke 29 straddling the guard 22 and having right angled hooked terminal arms 30 straddling the reel 15 and flanges 16 and adapted to frictionally engage the inner sides of said flanges 16 upon endwise movement of the plunger 27 rearwardly from a forward position in which said arms 30 clear the inner edges of the flanges 16, as shown in Figures 4 and 5. The plunger 27 is urged rearwardly by a coil spring 31 suitably fixed, at one end, as at 32, to the rear end of said plunger 27 and having its other end similarly fixed as at 33, to the front end of an adjustable, transversely square, slide 34 fitted in the rear end of the bore 5. For adjusting the slide 34, a hand screw 35 is extended into the bore 5 from the rear end thereof and threaded into the rear end of the slide, said hand screw rotatably extending through a bearing block 36 suitably fixed in the rear end of the bore 5 and provided with an end flange 37 countersunk in the handle 4. For moving the plunger 27 forwardly, a thumb lever 37 is pivoted intermediate its ends, as at 38, on the outer end of a stud 39 extending laterally from the plunger 27 out of the handle 4 through a longitudinal slot 40 in the top of said handle. A headed detent pin 41 is provided in the top of the handle 4 in advance of the stud 39 and which is slidably extended through a front end slot in the thumb lever 37 and through a flanged bushing 43 threaded into the outer end of a radial bore 44 in said handle 4, the inner end of said pin 41 being designed to snap into a socket 45 in one side of the plunger 27 registering with said pin 41 when said plunger 27 is in the described forward position. A coil spring 46 on said pin 41 between the bushing 43 and a fixed collar 47 on said pin, urges the pin 41 inwardly of the handle 4 for snap action engagement of the inner end of said pin with the socket 45. Since the pin 41 extends through the slot 42 in the thumb lever 37, by pressing on the rear end of said thumb lever, the same may be rocked on its pivot 38 to retract the detent pin 41 so that its inner end is withdrawn from the socket 45 in opposition to the spring 46. As best shown in Figure 4, the cross yoke 30 of said plunger 27 is slidably guided in a recess 47' provided in the rear end of the straddle yoke 6. The brake plunger 27 is provided with a longitudinal slot 48 therein through which the screw 11 in the front end of the handle 4, and the pin 13 extend out of interfering relation to said plunger. The slide 34 is similarly slotted, as at 49, for the extension of the screw 11 in the rear end of the handle 4 through said slide and for a similar purpose.

The rod section 2 is tubular, as will be understood, and of suitable resilient metal, preferably steel, and is detachably attached in any suitable manner to the joint 3.

The joint 3 is of a suitable type for yieldingly breaking downwardly and is suitably detachably attached in the socket 10.

As will be manifest, the reel 15 is designed to be snubbed or brought to a standstill by application of the described brake. Assuming that the brake plunger 27 is in the described forward, releasing position, braking action may be applied to the reel 15 by thumb pressure on the thumb lever 37 sufficient to swing said lever on the pivot 38 and retract the detent pin 41 so that the brake plunger 27 is released by said pin for movement rearwardly under the action of the spring 31, to thereby engage the arms 30 with the flanges 16 of the reel 15 in the manner already described. The braking action may be varied by opposing rearward movement of the brake plunger 27 by pressure of the thumb against the stud 39. In this connection, the spring 31 is designed so that when the brake plunger 27 is completely released, said spring will exert sufficient tension on the brake plunger 27 to frictionally lock the reel 15. However, the tension exerted by the spring 31 may be varied by adjustment of the slide 34 through the hand screw 35 so as to vary the maximum braking pressure to be applied to the reel 15. The line 26 extends to the reel 15 through one of the slots 25 and is prevented from uncoiling off said reel by the guard 22, while at the same time, the line on the reel is sufficiently exposed to the air through said slots 25 so as to quickly dry on the reel. Under pull on the line 26 opposed by the reel 15, the joint 3 will break downwardly. Thus, the joint 3 provides for additional resiliency in the rod and acts as a safeguard obviating breaking of the rod section 2. When it is desired to pack or transport the described fishing rod and reel, the rod section 2 may be detached from the joint 3, the joint 3 may be detached from the straddle yoke 6, and the sections 8, 9 may be detached from each other by removing the screws 11, 12, the reel 15 and guard 22 removed from the yoke 6 and the crank 18 and stud 17 detached, so that substantially all parts may be detached for packing in a compact bundle.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

What I claim is:

1. In a fishing rod, a handle section, a straddle yoke forming a front end extension of said handle, a rod section attached to said yoke, a reel straddled by and rotatably mounted in the yoke and having circumferential lateral edge flanges on opposite sides of the same, a brake plunger in said handle having a front end in said yoke straddling the reel and movable into engagement with said flanges upon movement of the plunger in one direction, spring means in said handle acting to move the plunger in said direction, releasable detent means for preventing such movement of said plunger, and manipulative means on said handle for releasing said releasable means at will.

2. In a fishing rod, a handle section, a straddle yoke forming a front end extension of said handle, a rod section attached to said yoke, a reel straddled by and rotatably mounted in the yoke and having circumferential lateral edge flanges on opposite sides of the same, a brake plunger in said handle having a front end in said yoke straddling the reel and movable into engagement with said flanges upon movement of the plunger in one direction, spring means in said handle acting to move the plunger in said direction, releasable detent means for preventing such movement of said plunger, and manipulative means on said handle for releasing said releasable means at will comprising a stud extending laterally from said plunger out of said handle, and a detent releasing thumb lever on said stud, said stud providing a presser member against which thumb pressure may be exerted to oppose movement of the plunger by said spring means.

3. In a fishing rod, an elongated handle, an elongated straddle yoke forming a front end extension of the handle, a reel straddled by said yoke and rotatably mounted therein, said handle and yoke comprising side by side half sections detachably connected together and an annular guard straddled by said yoke and surrounding said reel concentrically, said guard being clamped in said yoke by said sections.

ANTHONY J. MARSHAUS.

REFERENCES CITED

The following references are of record in the file of this patent:

UNITED STATES PATENTS

| Number | Name | Date |
|---|---|---|
| 507,453 | Read | Oct. 24, 1893 |
| 599,138 | Boyle | Feb. 15, 1898 |
| 1,595,275 | White | Aug. 10, 1926 |
| 1,605,710 | Ford | Nov. 2, 1926 |
| 1,984,272 | Krohn | Dec. 11, 1934 |
| 2,306,638 | Meisler | Dec. 29, 1942 |

FOREIGN PATENTS

| Number | Country | Date |
|---|---|---|
| 835,881 | France | Jan. 5, 1939 |